July 7, 1970        S. E. PETERSON        3,519,129

CONVEYER AND SORTING STRUCTURE IN AGRICULTURAL MACHINES

Filed Feb. 7, 1969        2 Sheets-Sheet 1

INVENTOR
SOREN E. PETERSON
BY M. Ralph Shaffer
HIS ATTORNEY

July 7, 1970   S. E. PETERSON   3,519,129
CONVEYER AND SORTING STRUCTURE IN AGRICULTURAL MACHINES
Filed Feb. 7, 1969   2 Sheets-Sheet 2

INVENTOR.
SOREN E. PETERSON
BY
HIS ATTORNEY

United States Patent Office 3,519,129
Patented July 7, 1970

3,519,129
CONVEYER AND SORTING STRUCTURE IN AGRICULTURAL MACHINES
Soren E. Peterson, 1649 West 3300 South,
Salt Lake City, Utah 84119
Continuation-in-part of application Ser. No. 672,220,
Oct. 2, 1967. This application Feb. 7, 1969, Ser.
No. 801,920
Int. Cl. B07b *13/04*
U.S. Cl. 209—83
9 Claims

ABSTRACT OF THE DISCLOSURE

The present invention provides improvements in agricultural machines for conveying, aligning, eliminating, and/or grading agricultural produce items such as potatoes, apples and citrus fruits, for example; specifically, improvements are provided in improved, tapered, ribbed, and preferably nubbed, traction-tread friction rolls. These are provided so as to insure proper forward and aligned movement of produce carried thereby, and this despite the presence of slime, mud, and other debris as might be present on the surfaces of the individual produce items. Preferably, these rolls have solid cores to provide for secure shaft mounting, and resilient outer portions to prevent caking of mud onto the ribbed and nubbed portions thereof.

---

This is a continuation-in-part of an application entitled "Agricultural Machines," Ser. No. 672,220, filed Oct. 2, 1967, which is now abandoned.

The present invention related to agricultural machines used for conveying, eliminating, and grading agricultural produce items such as potatoes and citrus fruits, and more particularly, to a new and improved agricultural machine wherein a plurality of stationary, revolving, traction-tread friction roller means constitute a stationary bed so that agricultural produce items, such as potatoes, being deposited thereon will advance forwardly over the bed.

In the invention, traction-tread, resilient, friction roller members are used which are ribbed, nubbed, and single- or double-tapered, this for providing conveying pockets for produce traveling thereover and drop-out pockets for undersized produce items; friction ribs and nubs of the rollers aid in supplying the prerequisite force necessary to advance unwashed produce over the rolls, and this regardless of the slime or other matter on the surface of the agricultural item.

Accordingly, the principal object of the present invention is to provide a new and improved agricultural machine for grading, conveying, or eliminating agricultural produce items, whatever purpose is desired, with improved, traction-tread friction roller therefor.

An additional object is to provide an improved traction-tread friction-roller for agricultural conveying systems.

An additional object is to provide improved, traction-tread nubbed rolls or roll members which will serve to center and convey forwardly produce objects such as potatoes in a desired manner without altering the general character of sorting pockets defined by plural roll members on adjacent shafts and their ability to eliminate or sort out graded ones of such potatoes.

An additional object is to provide nubbed, ribbed, tapered friction roll members accommodating the conveyance and proper sorting of small and large objects such as potatoes.

A further object of the invention is to provide an improved, tapered, pocket-forming friction roll having a hardened core to accommodate proper shaft insertion and an outer peripheral portion of softer, resilient character, whereby the flexing of the nubs, ribs, or other friction configurements of the surface exterior thereof will flex sufficiently during operation so as to prevent the build-up of mud cake on the friction producing portions of the roller.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing in which:

While the description which follows discusses the operation of the machine with regards to potatoes, it will be understood that the machine is equally usable for conveying, sorting, grading, and eliminating other types of agricultural produce such as citrus fruits, apples and so forth.

Figure 1:
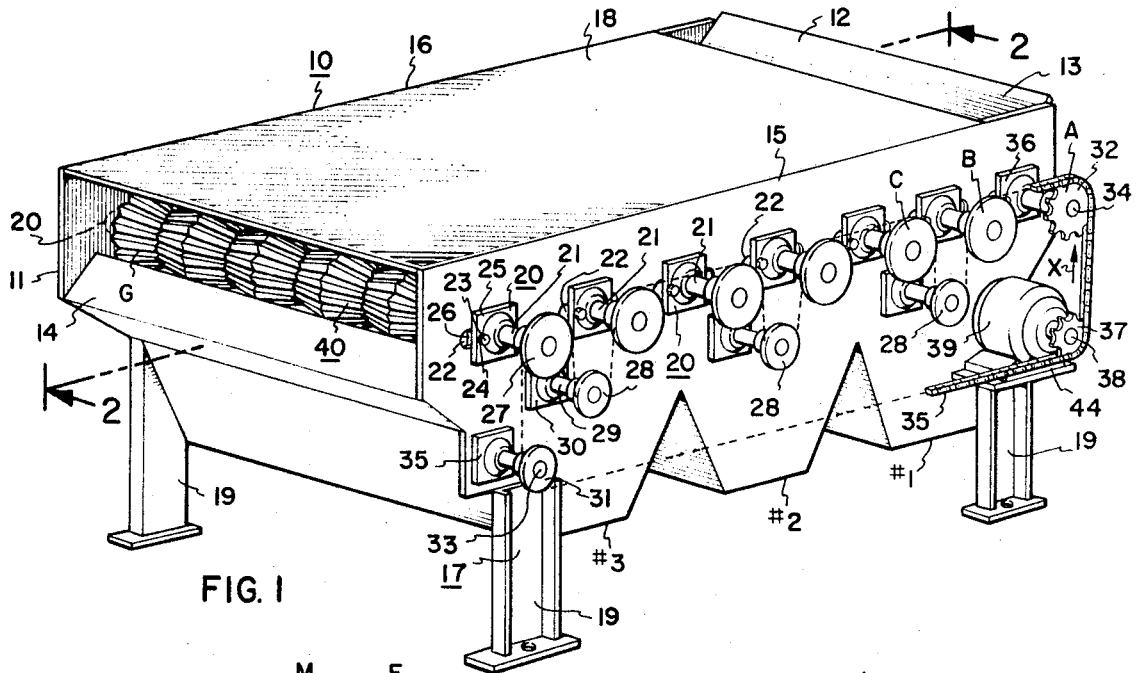
FIG. 1 is a perspective view of the machine incorporating the principles of the present invention.

In FIG. 1, a machine 10 is shown. Where the machine 10 is used as a small potato eliminator, the forward or discharge end 11 thereof will preferably feed into a series of traveling rolls for conveyance by the latter to appropriately designed cutting blades. However, the machine 10 may also be used simply as a grading or sorting machine wherein sizes of undersized potatoes will drop out of chutes Nos. 1, 2, and 3, into appropriate containers or onto conveyor belts, for example, for further processing.

In addition to having discharge end 11, the machine also includes a feed end or feed chute 12. Angulated end plates 13 and 14 may be provided in the structure to facilitate proper descent of potatoes at the feed end and discharge end, respectively, of the machine. Sides 15 and 16 are portions of the general framework 17 of the machine, and are upstanding and mutually parallel as indicated. If desired, a top plate 18 may be employed and, when employed, may be secured to the upstanding sides 15 and 16. Of course, it will be understood that the top plate 18 is optional and may be deleted when desired.

Framework 17 may include upstanding legs 19, welded or bolted to the sides 14 in a conventional manner.

The unit as shown in FIG. 1 can be wheel-mounted, or can form a part of a larger machine which includes a traveling roll bed and appropriate knife means, or can otherwise be provided to stand, temporarily or permanently, in a convenient place.

Journal bearings 20 respectively journal roller shafts 21 in their intended position to form a stationary travel bed for the potatoes descending through the feed chute 12. Slots 22 are provided in the sides 15 and 16 so as to provide for the selective longitudinally adjustment of the shaft. Suitable securement can be made simply through a bolt 23 passing through an aperture 24 of journal bearing mounting plate 25 and threaded into a retainer plate 26 disposed on the inside of side 15. One will observe that both sides of each journal plate 25 may be so secured to the respective sides, and all adjustable mountings of the journals 20 may be identical on both sides of the machine.

It will be understood that the "shafts 21" may comprise standard shafts, sleeves mounted on other shafts or other means, and so forth; the only restriction is that the roller means about to be described mounted on the shafts revolve in a "forward" direction, i.e., upwardly forwardly toward the discharge end of the machine.

Each of the shafts 21 have keyingly mounted thereto the respective sprocket 27. Idler sprockets 28 with their stub shafts 29 are secured by a mounting plate 30 to respective points along the respective sides 15 and 16 of the machine. Sprocket 28 is free to revolve, and is either freely mounted to stub shaft 29, or revolve thereon, or the shaft 29, when its sprocket is keyed thereto, will be journaled to the mounting means 30. Of course, it will be understood that a pulley or belt system or similar apparatus may be substituted for the sprocket system shown.

Corner idler and main sprockets 21 and 32 are respectively supplied their shafts (33 and 34) and are mounted by a mounting means (35 and 36) to the machine by bolts or other attachments; that which has been explained regarding the sprocket, shaft, and mounting means combination related to shafts 21 will apply equally to shafts 33 and 34, etc. A sprocket chain 35 traverses in serpentine manner the idler sprockets 28, 31, main sprockets 27 and 32, and the drive sprocket 37 keyed to drive shaft 39 or motor 39. Motor 39 is conventionally mounted by bolts 40 to the framework 17 in a conventional manner.

It will be understood that the respective shafts 21 on the opposite side of the machine will also be journaled to the journaling mounting means 20 disposed thereon; however, the sprocket arrangement shown with regard to side 15 need not be incorporated in the other side of the machine since the side 15 and its sprocket structure completes all necessary driving arrangements of the shafts.

It is of importance to note that the inclusion of the idler pulleys 28, together with the serpentine configuration of the drive chain 35 enable the sprockets to be driven satisfactorily without binding even though there are intermittent adjustments, longitudinally, of one or more of the shafts in the bed arrangement shown, or where the products are of different sizes.

Figure 2:
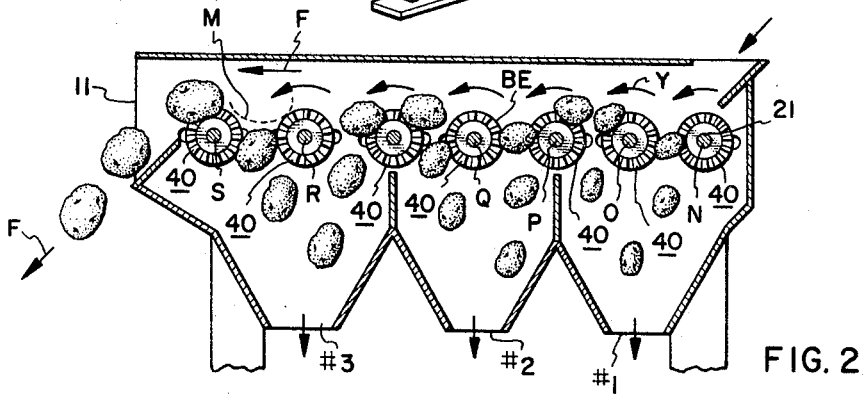
FIG. 2 is a fragmentary vertical section in reduced scale of the machine and is taken along the line 2—2 in FIG. 1.

In preferred form of the invention the sprocket teeth of the extreme right sprocket at position A will be slightly greater in number than the teeth of the sprocket 27 at position B. For this to be so, normally sprocket B will be slightly reduced in diameter relative to the sprocket 32 at position A. Correspondingly, there will be a slight reduction in the number of teeth and hence a reduction in the diameter of the sprocket 27 at C relative to the sprocket of B. Accordingly, this provision is made in order that, in a direction from the feed end to the discharge end of the machine, the sprockets progressively revolve at a slightly faster rate. This is for the purpose of precluding the possibility of wedging or sticking of potatoes between adjacent friction rollers. This results in the following consideration:

The power source of motor 39 is caused to be actuated such that the drive chain proceeds in direction X, thereby revolving the shafts and the friction rolls or rollers affixed to same in direction indicated by the arrows Y in FIG. 2. Since each succeeding friction roll (about to be described) on the respective, succeeding shafts revolve at a slightly increased speed, the upward frictional force exerted upon the potatoes by the next succeeding roll will tend to carry the potato over the roll and more than overcome the downward friction thrusting of the preceding roll. Hence, advancement of the potatoes over the stationary bed, constituted by independently revolving shafts and their friction or traction rollers provides proper potato travel in a forward position F as shown in FIG. 2.

It will be understood that there are other equivalent ways progressively increasing shaft speed, or at least the surface speeds of the friction roller means mounted upon those shafts may be progressively increased as the forward end of the machine is approached. For example, this might be done where the shafts are driven at equal speeds but where the diameters of the friction rollers, about to be described, are themselves progressively increased toward the forward end of the machine. However, one may rely upon merely the driving of the friction rollers (of equal diameter and identical speed revolvement) to advance the potatoes forwardly, through the technique of progressively increasing the surface speed of the friction rollers, as above described, is much to be desired.

Figure 3:
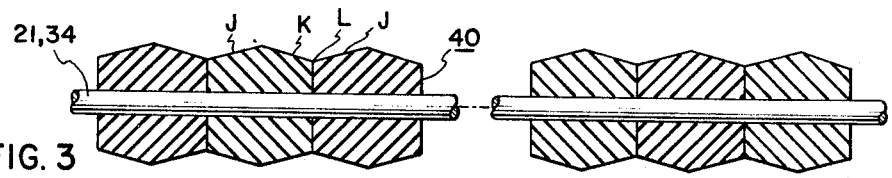
FIG. 3 is an enlarged fragmentary view of the shaft and friction roller means incorporated in several places in the machine to form a bed thereof.
Figure 5:
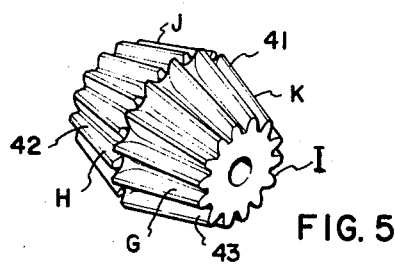
FIG. 5 is a perspective view of friction roll member, a plurality of which are preferably used in the machine of the present invention.

The friction of traction roller means 40 as shown in FIGS. 1 and 3 is segmented and made up of a plurality of friction roll members 41 as shown in FIG. 5. Members 41 must be resilient and preferably made of rubber or other elastomeric substance. Were these members not resilient, then the revolving tread comprised of ribs 1 would tend to skin or peel the produce being conveyed. The longitudinal ribs are essential to convey produce, such as potatoes, forwardly over successive ones of the revolving rollers, just as a traction tread is requisite in tires. "Longitudinal" as used herein means at least nominally parallel to the axis of revolvement of the rollers, as is to be contrasted to disposition in the direction of travel of the potatoes forwardly through the machine. "Center" refers to the nominal transverse central plane dividing the nominal halves of the individual members 41.

To consititute the end roll segments as at G in FIG. 1, a roll member 41 can simply be cut vertically, i.e., transversely severed at the junction of portions G and H in FIG. 5, and portion G in FIG. 5 used at the point G in FIG. 1. The remaining half of the roll might be used on the near end (not shown), of the respective shaft 21.

As seen in FIG. 5, the roll member 21 is double-tapered downwardly at J and K and provided with a traction tread comprising a plurality of longitudinal peripheral ribs 42 and 43. These ribs are for the purpose of increasing the friction effect of the roll members 41 so that slime, mud, and other debris that might collect on the potatoes will not deter their frictional, downward advance along the machine.

The individual roll members 41 are respectively pressed over a respective shaft 21, 34, in the manner shown in FIG. 3. The troughs at L of the junctures of adjacent roll members on others of the shafts so that potato receiving pockets M are formed by tapered surfaces J and K of adjacent roll members 41 of adjacent shafts. These pockets serve not only to receive the potatoes in a line, but also enable undersized ones of the potatoes to fall through such pockets into chutes Nos. 1, 2, and 3. See FIG. 2.

Figure 4:
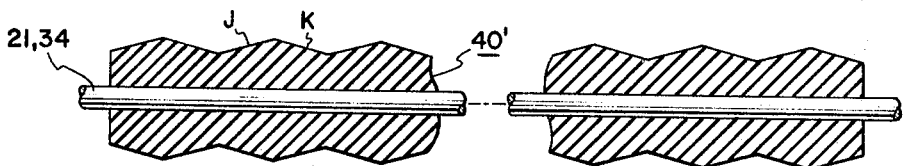
FIG. 4 is a fragmentary, section-view, is similar to FIG. 3, and illustrates the roller means employed as being an integral rather than a segmented structure.

At this point it may be mentioned that rather than comprising a segmented roller means as shown at 40 in FIG. 3, the roller means may be formed integrally as a one piece unit as shown in 45 in FIG. 4.

The various slots 22 in FIG. 1 as before explained, admit of appropriate adjustments of the shafts 21 and 34. However, whether or not adjustable, it is contemplated that the usual course will vary the spacing, at least between chosen, adjacent-shaft pairs. Thus, the shafts at N and O in FIG. 2 will be more closely spaced than shafts R and Q; and the latter will be more closely spaced than shafts R and S. Thus, the potato pockets M become progressively larger as the discharge end of the machine is approached by the potatoes. Progressively larger, undersized potatoes hence drop through the bed into the chutes 1, 2, and 3, in that order. Hence, only the large potatoes over pocket-aperture size arrive at the discharge end at 11 of the machine. The machine hence, can be aligned and adjusted so that only those potatoes over a certain size reach the discharge end of the machine. The smallest potatoes will drop through chute 1, the next larger potato through chute 2, and the still further larger potatoes through chute 3. Appropriate containers may be affixed to or simply disposed beneath the chutes 1–3, or potatoes may drop onto appropriate conveyor structure for further processing and/or collection.

The structure thus far described, in summary, operates as follows:

Potatoes are fed into the feed chute at 12 and descend downwardly such that the potatoes first land on the potato receiving pockets M which are in common with the roller means pair 40 disposed on shafts 21 and 34 at O and N in FIG. 2. Such potatoes as are smaller than pockets M will fall through them downwardly, through chute 1. The larger potatoes advance forwardly, either through rapid forward revolvement of the friction rollers 40, through incoming feed pressure, and/or because the surface speed of the forward roller means (pressed onto shaft 21 at position O) will be greater than the surface speed of the next preceding roller means 40 on shaft 34. Accordingly, the potatoes are advanced forwardly over the revolving roller means until, for example, new potato-pocket positions M are achieved which communicate with chute 2. Progressively larger potatoes drop through the pockets M and into chute 2, whereas the still larger potatoes are advanced to chute 3.

Hence, what is accomplished is an automatic grading of the potatoes which fall through the bed BE, through the plurality of roller means 40, and likewise an advancement of only those potatoes over a certain size, such that the latter can proceed to finally advance out of the discharge end 11.

Attention is again called to ribbed surfaces of the friction rolls so that the potatoes will be carried by the pockets over successive ones of the shafts 21.

The machine described can be used as an eliminator, as a conveyor, or as a grader or sorter. When used as an eliminator, it automatically grades the potatoes which are eliminated through the bed of the machine in addition to selecting those potatoes above the proper size for subsequent transport or processing.

Figure 6:
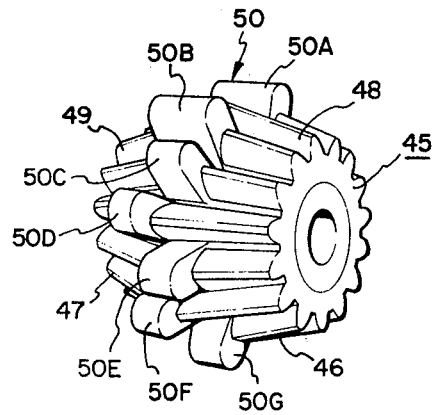
FIG. 6 is a perspective view of an alternate and improved roll member usable in the invention.
Figure 7:
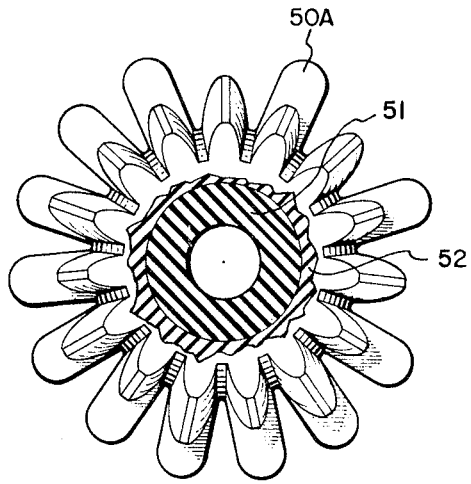
FIG. 7 is an enlarged elevation of the structure of FIG. 6, showing in cross-section the core area thereof which is hardened relative to the outer portion of the roll member.

In FIGS. 6 and 7 alternate roll or roll member 45 has oppositely tapered halves 46 and 47. These are provided with a plurality of respective, mutually spaced ribs 48 and 49 serving as peripheral traction or friction surfaces. Proximate the central, enlarged junction area of opposite halves 46 and 47 are a multiplicity of radially outwardly extending nubs defined as nub plurality 50. The latter is composed of nubs 50A–50G, etc. It is noted that the nubs are preferably spaced in varying degrees apart relative to the center or axis of roll member 45. This is for the purpose of varying depth and girth relative to the outwardly extending nubs 50A and 50B, 50B and 50C, etc. These pocket formations of varying size accommodate a wide range of potatoe sizes. Large potatoes will fit into the enlarged pocket area between nub 50A and 50B to be progressed forwardly and centrally relative to the point at which adjacent roll members meet, see FIG. 8. The small pockets formed as between nub 50B and nub 50C will drivingly function for very small potatoes so that these may be urged forwardly and centrally, as well. In a moderately moving conveying machine, very small potatoes would not be advanced nearly so effectively where the sole pockets relied upon are greatly enlarged relative to the girth of the potato, i.e. see the space between nubs 50A and 50B.

It is noted that preferably the nubs are irregularly spaced about the central periphery of the respective roll member 45. However, regular spacing can be employed so long as such spacing is less than 90 degrees, preferably less than 45 degrees; however, the structure operates in an optimum manner when taking the form shown in FIGS. 6 and 7.

Of importance is the inclusion of the outer portion 52 of roll member 45 over and in contiguous relationship with a central hardened core 51. The rolls are preferably made of rubber or other elastomeric material. The inner core 51 is desirous to have a durometer of the order of 70, whereas outer portion 52 is designed to be much more flexible, resilient and bendable, having a durometer of the order of 40. The purpose for including the softened outer portion 52 in the design of roll member 45 is to enable the nub plurality 50 and the several ribs 48 and 49 to be made resilient, easily bendable, and soft. The purpose for this is to enable the ribs and the nubs to be flexed during roll member use. Such flexure in experimentation is proven to retard the build-up of mud cake as might otherwise be formed through the passage of potatoes taken from the field and deposited on the conveyor structure including the roll plurality structure. Where the ribs are hard and not easily resiliently deformed, then there is no agitation as between material spaced in the ribs; the rib surface soon becomes tractionless and smooth mud surfaces will appear. The flexure of the ribs and nubs, in contrast, will loosen mud and slime deposits so that inter-rib spacing is preserved as well as inter-nub spacing.

Figure 8:
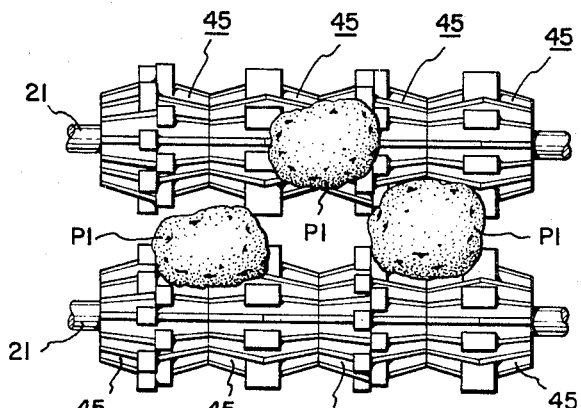
FIG. 8 is a fragmentary plan of plural ones of the roll members of FIG. 6 when mounted upon adjacent shafts of a sorting machine similar to the one shown in FIG. 1.
Figure 9:
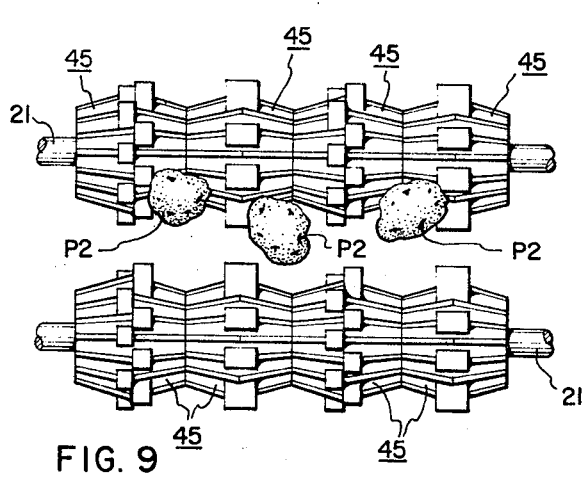
FIG. 9 is a plan similar to FIG. 8 illustrating the center rim of small potatoes relative to the pockets formed by respective pairs of roll members mounted upon adjacent shafts of the machine.

FIG. 8 illustrates the usage of the device in connection with large potatoes. It is noted that large potatoes will be caught by the large pockets, i.e. between 50A and 50B, 50C and 50D in FIG. 6, so as to be urged centrally, see FIG. 8, relative to the conveyor and sorting structure. Nubs on the alternate or adjacent roller are likewise employed to urge these large potatoes P1 forwardly over the roller sorting structure. Smaller potatoes, on the other hand, are engaged by the nubs and advanced centrally so as to proceed horizontally through and across the pockets formed by respective oppositely facing adjacent pairs of roller members, that is until the pockets are large enough, see FIG. 9, for the potatoes P2 to drop through. It is noted that the nubs 50 on FIGS. 6 and 8 advance the potatoes P2 centrally, see FIG. 9, so that the potatoes can fall through and into the center of the pocket structure between corresponding roller pairs where the potato size is below a pre-selected grade size. Larger potatoes will advance across the rolls, however, as illustrated in FIG. 8.

Hence, the outwardly extending nubs of the several roll members 45 operate to urge both large and small potatoes centrally of their respective paths forwardly across pockets and grading pocket apertures of the structure. Such pocket alignment is made considerably more difficult where the nub plurality 50 is eliminated and where simply the tapered pocket structure is relied upon solely, in combination with ribs 48 to align the potatoes. It is deemed most effective to have the ribs 48 and 49 present, flexible, and thus enable to avoid mud cake build-up while generally driving the potatoes centrally forwardly in a direction along a plane between adjacent roll members on the shafts. Then, any potatoes that are initially or subsequently out of line will fall into potato pockets defined by adjacent nubs 50A, 50B, or the shorter girth pockets 50B, 50C; these pockets, in acting upon an end of a potato, will urge the same into the travel path and centrally forwardly, as desired, over the pocket and aperture areas between longitudinally adjacent roll members of adjacent shafts, until the potatoes find an area which, because of its size, they can drop through.

While particular embodiments of the present invention have been shown and described, it will be obvious to those skilled in the art that changes and modifications may be made without departing from this invention in its broader aspects, and within the true spirit and scope of the invention.

I claim:

1. A revolvable, resilient, traction roller member for conveying agricultural produce items in agricultural machines, said roller member comprising an axially revolvable, tapered roll, said roll being provided with a tread comprising longitudinal ribs mutually spaced along the outer surface thereof, said roll also being provided with a series of mutually spaced, pocket-forming nubs extending radially outwardly beyond said ribs, laterally beyond the longitudinal contour thereof.

2. Structure according to claim 1 wherein said roll is tapered from its center in opposite directions, said nubs being positioned proximate said center.

3. Structure according to claim 1 wherein said nubs of said roll expose said ribs of said tread for traction with respect to items passing thereover.

4. In an agricultural machine having a feed end and a discharge end and including, in combination, a support having a pair of opposite sides, a plurality of parallel shafts transversely disposed wtih respect to and journalled to said sides, a plurality of traction roller means respectively disposed on said shafts, said traction roller means of adjacent shafts being contoured to form produce-item-receiving pockets, said traction roller means in the aggregate forming a bed for advancing individual produce items from the feed end to the discharge end of said machine, and means for revolving said shafts simultaneously and in the same direction, forwardly toward said discharge end: an improvement wherein individual ones of said traction roller means comprises an axially revolvable, tapered roll, said roll being provided with a tread comprising longitudinal ribs mutually spaced along the outer surface thereof, said roll having a hardened core for shaft mounting and an elastomeric, flexible outer shell portion integral with said core and of less durometer than said core.

5. Structure according to claim 4 wherein said roll is uniformly tapered from its center in opposite directions.

6. Structure according to claim 4 wherein said roll is uniformly tapered in one direction.

7. In an agricultural machine having a feed end and a discharge end and including, in combination, a support having a pair of opposite sides, a plurality of parallel shafts transversely disposed with respect to and journalled to said sides, a plurality of traction roller means respectively disposed on said shafts, said traction roller means of adjacent shafts being contoured to form produce-item-receiving pockets, said traction roller means in the aggregate forming a bed for advancing individual produce items from the feed end to the discharge end of said machine, and means for revolving said shafts simultaneously and in the same direction, forwardly toward said discharge end: an improvement wherein individual ones of said traction roller means comprises an axially revolvable, tapered roll, said roll being provided with a tread comprising longitudinal ribs mutually spaced along the outer surface thereof, and a plurality of mutually spaced nubs extending radially outwardly, laterally beyond the longitudinal contour of said ribs and defining between said nubs item-receiving pockets.

8. In an agricultural machine having a feed end and a discharge end and including, in combination, a support having a pair of opposite sides, a plurality of parallel shafts transversely disposed with respect to and journalled to said sides, a plurality of traction roller means respectively disposed on said shafts, said traction roller means of adjacent shafts being contoured to form produce-item-receiving pockets, said traction roller means in the aggregate forming a bed for advancing individual produce items from the feed end to the discharge end of said machine, and means for revolving said shafts simultaneously and in the same direction forwardly toward said discharge end: an improvement wherein individual ones of said traction roller means comprises an axially revolvable, tapered roll, said roll having a medial enlarged area tapering radially inwardly in opposite directions, said roll having a plurality of axially disposed ribs on opposite sides thereof and a plurality of mutually spaced nubs at said medial enlarged area and extending radially and laterally, outwardly beyond the longitudinal contour of said ribs.

9. A revolvable, resilient, traction roller member for conveying agricultural produce items in agricultural machines, said roller member including a horizontal-axis axially-revolvable, tapered roll, said roll being provided with a tread comprising plural, upstanding, mutually spaced, pocket-forming first protuberance means, said roll also being provided with plural, radially extending, second protuberance means mutually spaced apart a greater distance than said first protuberance means, for defining produce-item pockets between adjacent ones of said second protuberance means, and extending radially beyond said first protuberance means and at an extremity of and laterally beyond the pocket formation thereof.

References Cited
UNITED STATES PATENTS

| | | | |
|---|---|---|---|
| 2,082,302 | 6/1937 | Ross | 209—106 X |
| 2,245,546 | 6/1941 | Stockdale | 209—106 |
| 2,949,189 | 8/1960 | Haines | 209—106 |
| 2,983,376 | 5/1961 | Troyer | 209—106 |

RICHARD A. SCHACHER, Primary Examiner

U.S. Cl. X.R.

29—121; 209—106